US012375446B2

(12) United States Patent
Neeli

(10) Patent No.: US 12,375,446 B2
(45) Date of Patent: Jul. 29, 2025

(54) MACHINE LEARNING CAPABLE MAC FILTERING FOR ENFORCING EDGE SECURITY OVER MAC RANDOMIZATION IN WLAN NETWORKS

(71) Applicant: Fortinet, Inc., Sunnyvale, CA (US)

(72) Inventor: Srinivasa Subbarao Neeli, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 104 days.

(21) Appl. No.: 17/364,490

(22) Filed: Jun. 30, 2021

(65) Prior Publication Data
US 2023/0006967 A1 Jan. 5, 2023

(51) Int. Cl.
*H04L 9/40* (2022.01)
*H04L 101/622* (2022.01)

(52) U.S. Cl.
CPC ...... *H04L 63/0236* (2013.01); *H04L 63/0263* (2013.01); *H04L 63/20* (2013.01); *H04L 2101/622* (2022.05)

(58) Field of Classification Search
CPC .......... H04L 2101/622; H04L 63/0236; H04L 63/0263; H04W 12/088; H04W 84/12
See application file for complete search history.

(56) References Cited

U.S. PATENT DOCUMENTS

| | | | | |
|---|---|---|---|---|
| 10,616,760 B1 * | 4/2020 | Salem | ................. | H04W 12/037 |
| 10,771,438 B2 * | 9/2020 | Zuniga | ................. | H04W 12/08 |
| 10,820,202 B1 * | 10/2020 | Gundavelli | ........... | H04M 15/62 |
| 11,050,746 B2 * | 6/2021 | Gundavelli | ......... | H04L 63/0876 |
| 11,641,340 B2 * | 5/2023 | Lumbatis | ................ | H04L 61/50 |
| | | | | 709/245 |
| 11,683,401 B2 * | 6/2023 | Ahn | ....................... | H04L 43/026 |
| | | | | 370/329 |
| 11,696,133 B2 * | 7/2023 | Montemurro | ....... | H04L 41/0813 |
| | | | | 726/6 |
| 11,706,255 B2 * | 7/2023 | McKibben | .......... | H04L 63/0876 |
| | | | | 370/338 |
| 11,722,849 B2 * | 8/2023 | Aguilera Bonet | .... | H04W 4/029 |
| | | | | 455/456.1 |
| 11,849,344 B2 * | 12/2023 | Henry | ................... | H04L 63/162 |
| 12,041,529 B2 * | 7/2024 | Ansley | ................ | H04L 63/0414 |
| 12,047,866 B2 * | 7/2024 | Hamilton | ................ | H04W 76/11 |
| 12,047,867 B2 * | 7/2024 | Hamilton | ................ | H04W 8/26 |

(Continued)

OTHER PUBLICATIONS

No stated author; FortiOS—Handbook version 6.0; 2020; Retrieved from the Internet https://docs.fortinet.com/product/fortigate/6.0. pp. 1-2711, as printed. (Year: 2020).*

(Continued)

*Primary Examiner* — Michael W Chao
(74) *Attorney, Agent, or Firm* — Law Office of Dorian Cartwright; Dorian Cartwright

(57) ABSTRACT

Specific connection request is refused responsive to a match on the MAC ban list. If not on the MAC ban list, and a station has MAC randomization enabled, the specific connection requests is also checked against the hostname ban list, wherein the specific connection request is refused responsive to a match on the hostname ban list. The specific new connection request is allowed to proceed responsive to not matching the MAC ban list and not matching the hostname ban list.

5 Claims, 5 Drawing Sheets

(56) References Cited

U.S. PATENT DOCUMENTS

| | | | | |
|---|---|---|---|---|
| 2003/0177267 | A1* | 9/2003 | Orava | H04L 63/0407 709/245 |
| 2006/0187890 | A1* | 8/2006 | Lin | H04W 88/02 455/403 |
| 2007/0143827 | A1* | 6/2007 | Nicodemus | H04L 63/102 726/2 |
| 2008/0052384 | A1* | 2/2008 | Marl | H04L 12/2807 709/224 |
| 2009/0158302 | A1* | 6/2009 | Nicodemus | G06F 21/577 726/6 |
| 2013/0007848 | A1* | 1/2013 | Chaskar | G06F 21/554 726/4 |
| 2015/0256413 | A1* | 9/2015 | Du | H04L 41/145 370/242 |
| 2016/0135041 | A1* | 5/2016 | Lee | H04L 45/745 726/3 |
| 2016/0269359 | A1* | 9/2016 | Adrangi | H04W 12/02 |
| 2018/0103348 | A1* | 4/2018 | Malone | H04W 4/029 |
| 2018/0324142 | A1* | 11/2018 | Adrangi | H04L 63/0414 |
| 2018/0357422 | A1* | 12/2018 | Telang | G06F 21/577 |
| 2019/0199774 | A1* | 6/2019 | Demsey | H04L 67/04 |
| 2020/0053827 | A1* | 2/2020 | Chan | H04L 43/106 |
| 2020/0213352 | A1* | 7/2020 | Fainberg | H04W 12/122 |
| 2020/0314641 | A1* | 10/2020 | Tewari | H04W 12/71 |
| 2021/0329462 | A1* | 10/2021 | Bernsen | H04L 9/30 |
| 2022/0046384 | A1* | 2/2022 | Trifilo | H04W 4/029 |
| 2022/0052981 | A1* | 2/2022 | Shivajirao | H04L 61/4588 |
| 2022/0158909 | A1* | 5/2022 | Chandrasekaran | G06F 3/0482 |
| 2022/0200950 | A1* | 6/2022 | Sekar | H04W 12/06 |
| 2022/0225221 | A1* | 7/2022 | Giraldo-Suarez | H04W 48/14 |
| 2022/0312192 | A1* | 9/2022 | Graybeal | H04W 8/26 |
| 2022/0322089 | A1* | 10/2022 | Cafasso | H04W 48/04 |
| 2022/0417099 | A1* | 12/2022 | Yakovlev | H04L 41/0816 |
| 2023/0025898 | A1* | 1/2023 | Kaplan | H04W 12/086 |
| 2023/0246998 | A1* | 8/2023 | Lumbatis | H04L 61/50 709/245 |
| 2024/0155335 | A1* | 5/2024 | de la Oliva | H04W 12/71 |

OTHER PUBLICATIONS

Robyns et al.; Noncooperative 802.11 MAC Layer Fingerprinting and Tracking of Mobile Devices; 2017; retrieved from the Internet https://onlinelibrary.wiley.com/doi/epdf/10.1155/2017/6235484; pp. 1-21, as printed. (Year: 2017).*

* cited by examiner

MACHINE LEARNING CAPABLE MAC FILTERING FOR ENFORCING EDGE SECURITY OVER MAC RANDOMIZATION IN WLAN NETWORKS

FIELD OF THE INVENTION

The invention relates generally to computer devices and computer networking, and more specifically, to detecting use of randomized MAC address to bypass MAC address ban filtering, while authenticating a station on a Wi-Fi network for access to a backbone network.

BACKGROUND

As computer networks track more personal information, many users seek to offset these intrusions with data privacy techniques. For example, Mac randomization prevents listeners from using MAC addresses to build a history of device activity by randomizing MAC addresses used to connect with access points. Traditionally, a permanent MAC address of a NIC card is a string of numbers and letters used for tagging communications with an enterprise network. They are "burned in" identifiers that give them a unique worldwide address. The MAC randomization feature is supported by Windows, iOS and Android for dynamically changing the MAC address used for over-the-air communications.

Problematically, computer devices are banned from enterprise networks as identified from the MAC address. Banning may be due to malicious behavior, violations of general usage policy or of MAC-based policy, have repeatedly failed authentication, or other reasons. By using randomized MAC addresses, banned computer devices may still be able access the enterprise network after being banned.

Therefore, what is needed is a robust technique for detecting use of randomized MAC address to bypass MAC address ban filtering, while authenticating a station on a Wi-Fi network for access to a backbone network.

SUMMARY

These shortcomings are addressed by the present disclosure of methods, computer program products, and systems for detecting use of randomized MAC address to bypass MAC address ban filtering, while authenticating a station on a Wi-Fi network for access to a backbone network.

In one embodiment, specific connection request is refused responsive to a match on the MAC ban list. If not on the MAC ban list, and a station has MAC randomization enabled, the specific connection requests is also checked against the hostname ban list, wherein the specific connection request is refused responsive to a match on the hostname ban list.

In another embodiment, the specific new connection request is allowed to proceed responsive to not matching the MAC ban list and not matching the hostname ban list.

Advantageously, computer hardware and computer networks operate better without MITB intrusions.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for detecting use of randomized MAC address to bypass MAC address ban filtering, while authenticating a station on a Wi-Fi network for access to a backbone network. One of ordinary skill in the art will recognize many additional variations made possible by the succinct description of techniques below.

Figure 2:
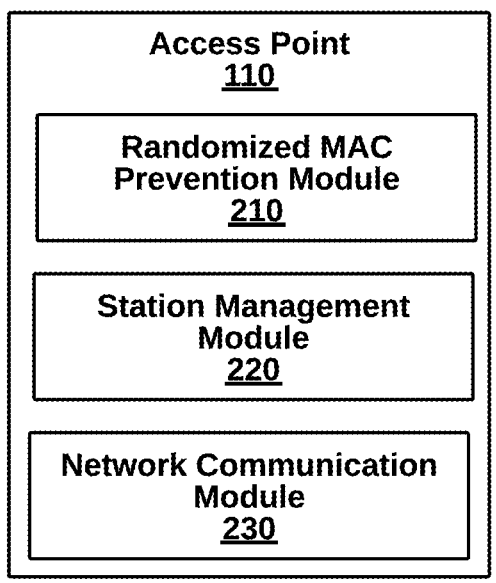
FIG. 2 is a more detailed illustration of an access point of the system of FIG. 1, according to an embodiment.
Figure 3:
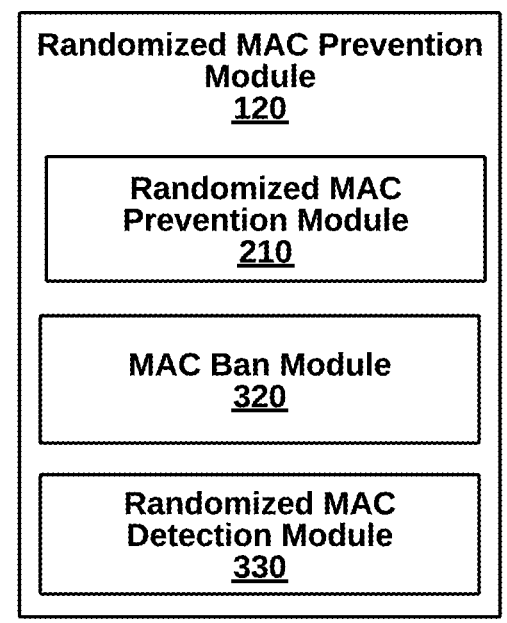
FIG. 3 is a more detailed illustration of aa MAC bypass prevention module of FIG. 2, according to some embodiments.

I. Systems for Preventing Bypass of MAC Address Ban Filtering (FIGS. 1-3)

Figure 1:
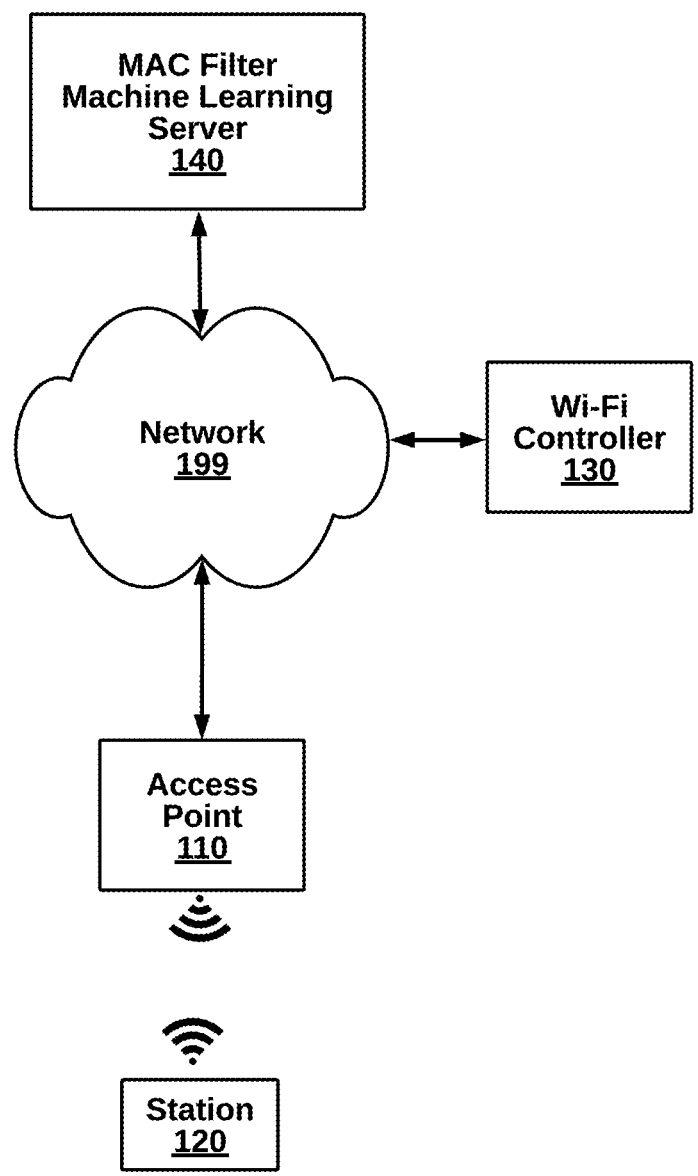
FIG. 1 is a high-level illustration of a system for detecting use of randomized MAC address to bypass MAC address ban filtering, while authenticating a station on a Wi-Fi network for access to a backbone network, according to an embodiment.

FIG. 1 is a high-level illustration of a system 100 for detecting use of randomized MAC address to bypass MAC address ban filtering, while authenticating a station on a Wi-Fi network for access to a backbone network, according to an embodiment. The system 100 includes an access point 110 and a station 120. Many other embodiments are possible, for example, more or fewer access points, more or fewer stations, and additional components, such as firewalls, routers and switches. The system 100 components can be located locally on a LAN or include remote cloud-based devices, and can be implemented in hardware, software, or a combination similar to the example of FIG. 6.

The components of the system 100 are coupled in communication over a network 199. Preferably, the access point 130 are connected to the data communication system via hard wire. Other components, such as the station 120 are connected indirectly via wireless connection. The network 199 can be a data communication network such as the Internet, a WAN, a LAN, WLAN, a cellular network (e.g., 3G, 4G, 5G or 6G), or a hybrid of different types of networks. Various data protocols can dictate format for the data packets.

In one embodiment, the access point 110 checks for attempts to bypass MAC list filtering with an additional check on hostname filtering. When stations violate network policy, or need to be kept off an enterprise network for other reasons, a unique MAC address associated with a NIC card of the station can be added to a MAC ban list. When the station 120 has MAC randomization enabled for using different MAC addresses, the bypass is prevented by checking against hostname as well. If both checks pass muster, then client connection is allowed to proceed. In another embodiment, the access point 110 cooperates with a cloud-based MAC filter machine learning server 140. A central perspective allows global policies to be implemented and for more powerful MAC ban lists and hostname ban lists. Similarly, the access point 110 can cooperate with a Wi-Fi controller 130 located locally on the enterprise network for sharing information among access points.

The access point 110 also performs other functions related to managing stations. Additional embodiments of the access point are described with respect to FIG. 2 below.

The station 120 responds to beacons broadcast by the access point 120 and other access points, with a probe request to join a particular SSID. The station 120 can be a mobile client, for instance, a smartphone, a tablet computer, or a smart appliance.

FIG. 2 is a more detailed illustration of the access point 110 of the system 100 of FIG. 1. The access point 110 includes a randomized MAC prevention module 210, a station management module 220, and a network communication module 230. The modules can be implemented in source code stored in non-transitory memory executed by a processor. Alternatively, the modules can be implemented in hardware with microcode. The modules can be singular or representative of functionality spread over multiple components.

The randomized MAC prevention module 210 in one embodiment checks for bypass attempts using MAC randomization, as described herein. The randomized MAC prevention module 210 is part of a firewall, in an implementation.

The station management module 220 oversees wireless connections to stations using a BSSID of the access point 110 in order to exchange data messages with the network 199. The network communication module 230 generally refers to the network packetizing processes, Wi-Fi transceivers (e.g., MIMO antennae), Ethernet transceivers, hardware ports, software ports, and related components.

The randomized MAC prevention module 210 further comprises, as shown in FIG. 3, a connection manager 310, a MAC ban module 320, a randomized MAC detection module 330, and a host ban module 340.

The connection manager 310 can receive new station connection requests from stations wanting to associate with the access point 110. For example, a probe request sent from the station 130 requesting access to the network 199 over Wi-Fi.

The MAC ban module 320 to add new MAC addresses to a MAC ban list responsive to behavior against policy, and to check the new station connection requests against the MAC ban list, wherein a specific connection request is refused responsive to a match on the MAC ban list. Associations with access points are halted responsive to the new station connection request matching the MAC ban list and not matching the hostname ban list.

The randomized MAC detection module 330 performs an additional check on the new station connection request. In more detail, the randomized MAC detection module 330 identifies whether MAC randomization is enabled for new station connection requests. One implementation of identifying MAC randomization [insert details].

The host ban module 340 to add new host names to a hostname ban list responsive to behavior against policy, and to check new station connection requests with MAC randomization enabled against the hostname ban list then client connection refused, wherein the specific connection request is refused responsive to a match on the hostname ban list.

II. Methods for Preventing Bypass of MAC Address Ban Filtering (FIGS. 4-5)

Figure 4:
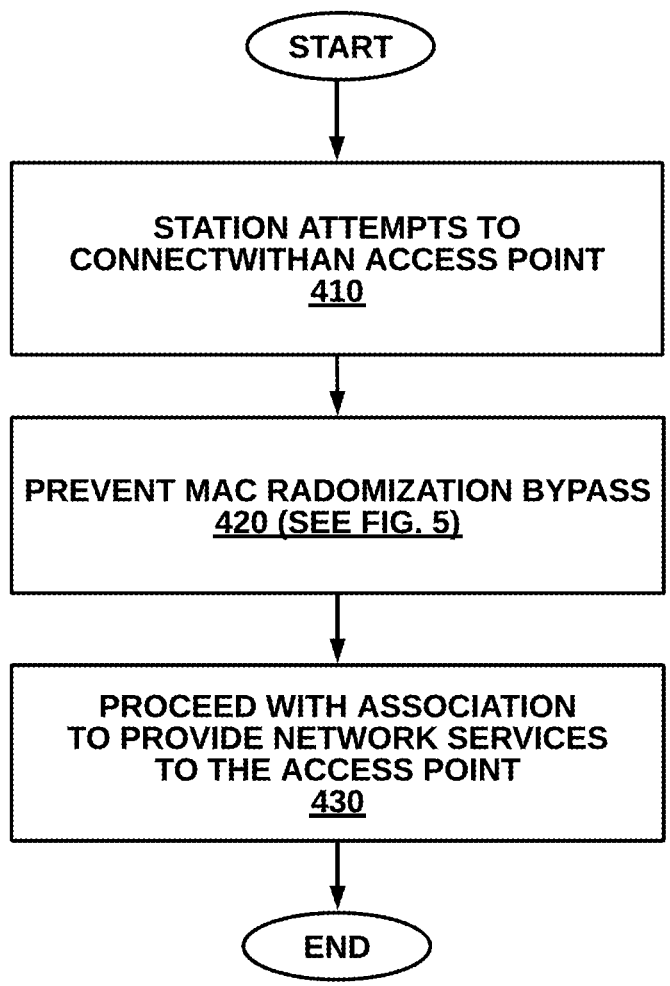
FIG. 4 is a high-level flow diagram illustrating a method for detecting use of randomized MAC address to bypass MAC address ban filtering, while authenticating a station on a Wi-Fi network for access to a backbone network, according to one preferred embodiment.

FIG. 4 is a high-level flow diagram illustrating a method 400 for detecting use of randomized MAC address to bypass MAC address ban filtering, while authenticating a station on a Wi-Fi network for access to a backbone network, for example, by the system 100 of FIG. 1. The steps are merely representative groupings of functionality, as there can be more or fewer steps, and the steps can be performed in different orders. Many other variations of the method 400 are possible.

At step 410, a station attempts to connect with an access point. At step 420, an access point, or other network device, prevents MAC randomization bypass, as described below. At step 430, the access point proceeds with association to provide network services to the access point.

Figure 5:
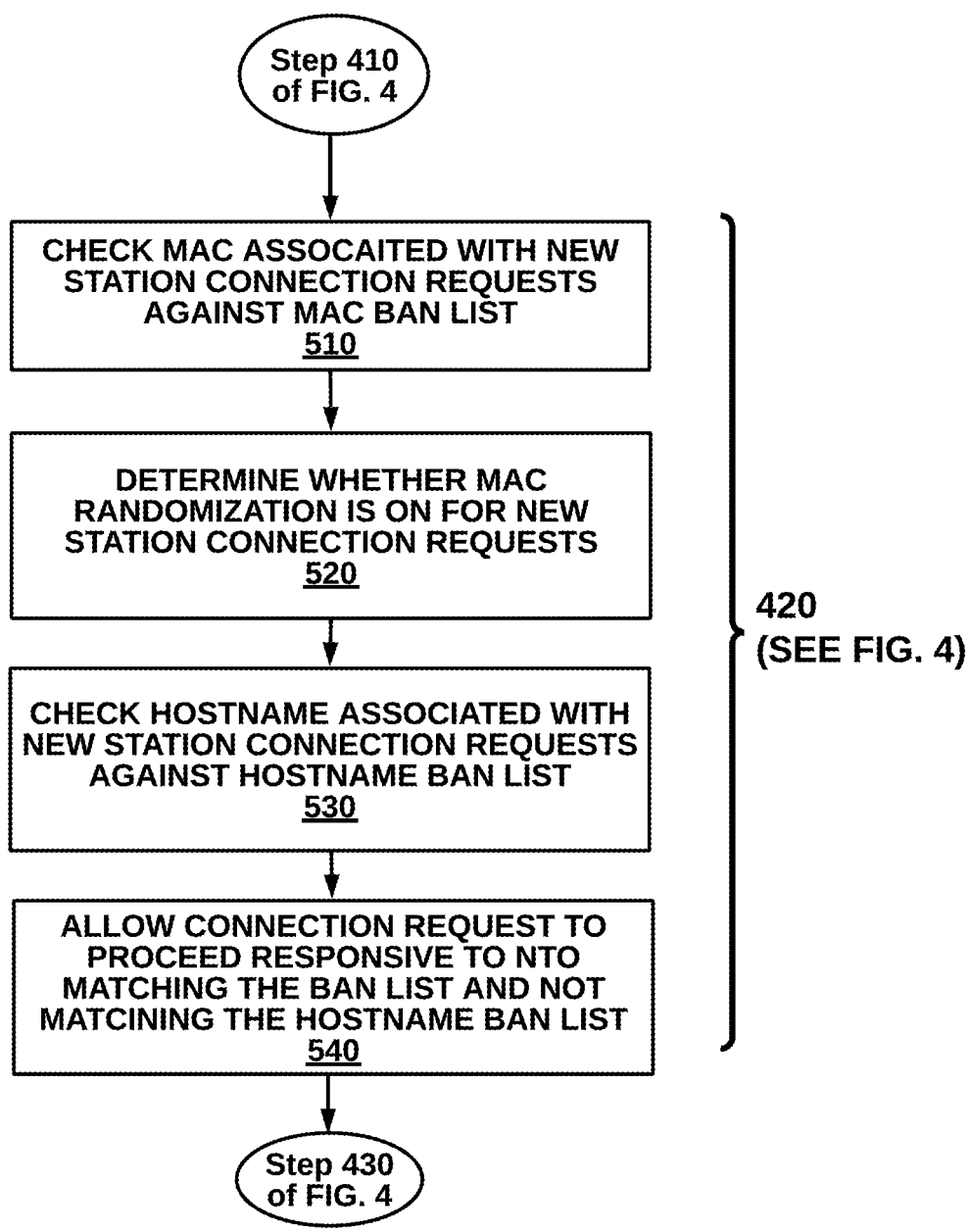
FIG. 5 is a more detailed flow diagram illustrating the step of automatically configuring link aggregation of incompatible data ports for the method of FIG. 4, according to one embodiment.

Returning to the prevent MAC randomization bypass step 420, more details are shown in FIG. 5. At step 510, the new station connection requests are checked against the MAC ban list, a specific connection request is refused responsive to a match on the MAC ban list. In an embodiment, new MAC addresses are added to the MAC ban list responsive to behavior against policy.

At step 520, it is determined whether MAC randomization is enabled for new station connection requests. If so, new station connection requests with MAC randomization enabled against the hostname ban list then client connection refused, at step 530, wherein the specific connection request is refused responsive to a match on the hostname ban list. In an embodiment, new hostnames are added to the hostname ban list responsive to behavior against policy. The lists for MAC bans versus hostname bans can be completely synchronized for each entry, in one embodiment. In another embodiment, only partial data is provided.

At step 540, the specific new connection request is allowed to proceed responsive to not matching the MAC ban list and not matching the hostname ban list

III. Generic Computing Device (FIG. 6)

Figure 6:
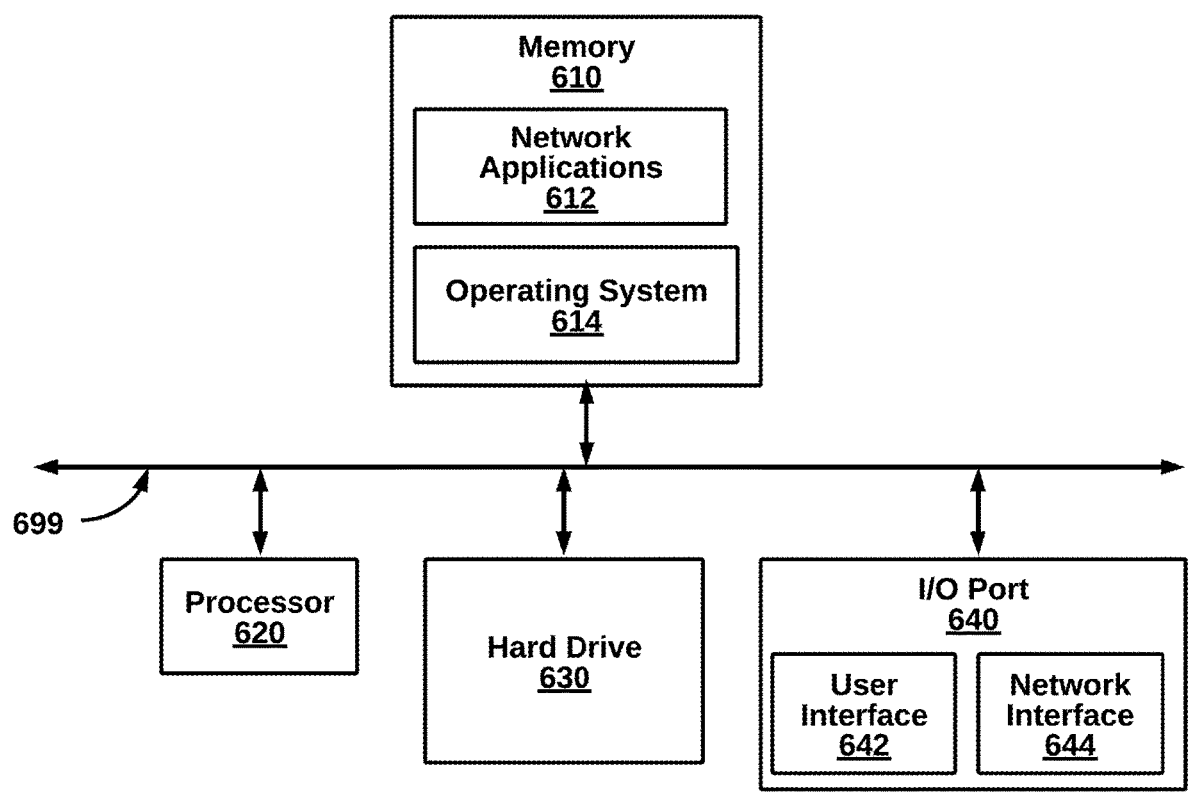
FIG. 6 is an example of a computing environment, according to an embodiment.

FIG. 6 is a block diagram illustrating an example computing device 600 for use in the system 100 of FIG. 1, according to one embodiment. The computing device 600 is implementable for each of the components of the system 100 (e.g., the access point 110, the station 120, the Wi-Fi controller 130 and the MAC filter machine learning server 140). The computing device 600 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 600, of the present embodiment, includes a memory 610, a processor 620, a storage drive 630, and an I/O port 640. Each of the components is coupled for electronic communication via a bus 699. Communication can be digital and/or analog and use any suitable protocol.

The memory 610 further comprises network applications 612 and an operating system 614. The network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The processor 620 can be a network processor (e.g., optimized for IEEE 802.11, IEEE 802.11AC or IEEE 802.11AX), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the storage drive 630.

The storage drive 630 can be any non-volatile type of storage such as a magnetic disc, EEPROM (electronically erasable programmable read-only memory), Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g., an RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. An access point on a data communication network, for detecting use of randomized MAC address to bypass MAC address ban filtering, while authenticating a station on a Wi-Fi network for access to a backbone network, the access point comprising:
   a processor;
   a network interface communicatively coupled to the processor and to the enterprise network and to the Wi-Fi network; and
   a memory, storing:
      a MAC ban module to responsive to behavior against policy, add MAC addresses to a MAC ban list;
      a hostname ban module to add hostnames associated with the added MAC addresses, to a hostname ban list;
      a connection manager to receive a specific station connection request to associate with the access point;
      wherein the MAC ban module checks the specific station connection request against the MAC ban list, and wherein a specific connection request is refused responsive to a match on the MAC ban list;
      wherein the hostname ban module checks the specific station connection request against the hostname ban list; and
      a randomized MAC detection module to identify if MAC randomization is enabled for new station connection requests based on the specific station connection request not matching the MAC ban list and matching the hostname ban list;
      wherein the connection manager refuses the specific connection request responsive to having MAC randomization enabled, and allowing the specific connection request to proceed responsive to not having MAC randomization enabled.

2. The access point of claim 1, wherein the MAC ban module adds new MAC addresses to a MAC ban list responsive to network behavior against policy.

3. The access point of claim 1, wherein the host ban module adds new host names to a host name ban list responsive to behavior against policy.

4. A computer-implemented method in an access point on an enterprise network that connects with a plurality of stations over a Wi-Fi network for data transfers, for detecting use of randomized MAC address to bypass MAC address ban filtering, while authenticating a station on a Wi-Fi network for access to a backbone network, the method comprising the steps of:
   responsive to behavior against policy, adding new MAC addresses to a MAC ban list, and adding hostnames associated with the MAC addresses to a hostname ban list;
   receiving a specific station connection request to associate with the access point;
   checking the specific station connection request against the MAC ban list, wherein a specific connection request is refused responsive to a match on the MAC ban list;
   checking the specific station connection request against the hostname ban list;
   identifying if MAC randomization is enabled for the specific station connection request based on the specific station connection request, not matching the MAC ban list, matching the hostname ban list; and
   refusing the specific connection request responsive to having MAC randomization enabled, and allowing the specific connection request to proceed responsive to not having MAC randomization enabled.

5. A non-transitory computer-readable media in an access point on an enterprise network that connects with a plurality of stations over a Wi-Fi network for data transfers, when executed by a processor, for detecting use of randomized MAC address to bypass MAC address ban filtering, while authenticating a station on a Wi-Fi network for access to a backbone network, the method comprising the steps of:
   responsive to behavior against policy, adding MAC addresses to a MAC ban list, and adding hostnames associated with the MAC addresses to a hostname ban list;
   receiving a specific station connection request to associate with the access point;
   checking the specific station connection request against the MAC ban list, wherein a specific connection request is refused responsive to a match on the MAC ban list;
   checking the specific station connection request against the hostname ban list;
   identifying if MAC randomization is enabled for the specific station connection request based on the specific station connection request, not matching the MAC ban list, matching the hostname ban list; and
   refusing the specific connection request responsive to having MAC randomization enabled, and allowing the specific connection request to proceed responsive to not having MAC randomization enabled.

* * * * *